United States Patent
Keithly et al.

(10) Patent No.: US 7,563,471 B2
(45) Date of Patent: *Jul. 21, 2009

(54) COMMERCIAL POULTRY BREEDER CITRUS BYPRODUCT FEED SUPPLEMENT AND METHOD

(75) Inventors: James H. Keithly, Bradenton, FL (US); Thomas Taggart, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 209 days.

This patent is subject to a terminal disclaimer.

(21) Appl. No.: 10/784,855

(22) Filed: Feb. 23, 2004

(65) Prior Publication Data

US 2004/0219279 A1    Nov. 4, 2004

Related U.S. Application Data

(63) Continuation-in-part of application No. 10/017,126, filed on Dec. 14, 2001.

(51) Int. Cl.
A23K 1/00 (2006.01)

(52) U.S. Cl. .......................... 426/635; 426/2; 426/616; 426/805

(58) Field of Classification Search .............. 119/51.01; 426/2, 616, 623, 805, 807, 635; 424/442
See application file for complete search history.

(56) References Cited

U.S. PATENT DOCUMENTS

| | | | |
|---|---|---|---|
| 2,186,907 A | 1/1940 | Overton et al. | |
| 3,647,476 A | 3/1972 | Swisher | |
| 3,878,304 A | 4/1975 | Moore | |
| 3,966,984 A | 6/1976 | Cocke et al. | |
| 4,082,677 A | 4/1978 | Zollar et al. | |
| 4,301,719 A | 11/1981 | Gerow | |
| 4,331,692 A | 5/1982 | Devici et al. | |
| 4,357,358 A | 11/1982 | Schanze | |
| 4,536,494 A | 8/1985 | Carter | |
| 4,560,561 A * | 12/1985 | Henderson et al. | 426/74 |
| 4,789,551 A | 12/1988 | Sayle | |
| 5,082,675 A | 1/1992 | Jackson et al. | |
| 5,304,374 A | 4/1994 | Graves et al. | |
| 5,425,944 A | 6/1995 | Harich | |
| 5,631,001 A | 5/1997 | Harich et al. | |
| 5,972,343 A | 10/1999 | Therrien | |

(Continued)

FOREIGN PATENT DOCUMENTS

DE    196 17 224 A1    11/1997

(Continued)

OTHER PUBLICATIONS

Deyoe, et al., "Citrus Bioflavonoids in Broiler Diets," Poultry Science, 1962.

(Continued)

*Primary Examiner*—T. Nguyen
(74) *Attorney, Agent, or Firm*—Banner & Witcoff, Ltd.

(57) ABSTRACT

Disclosed is an improved poultry breeder feed diet composition and uses incorporating the feed diet composition. The breeder feed diet compositions include byproduct or waste material from citrus juice extraction. The citrus peel byproduct compositions improve poultry breeder characteristics and economics.

16 Claims, 1 Drawing Sheet

U.S. PATENT DOCUMENTS

| | | | |
|---|---|---|---|
| 5,976,580 A | 11/1999 | Ivey et al. | |
| 6,033,694 A | 3/2000 | Boley | |
| 6,126,986 A | 10/2000 | Harris et al. | |
| 6,523,496 B1 * | 2/2003 | Keithly et al. | 119/171 |
| 6,783,777 B2 * | 8/2004 | Miller et al. | 426/2 |

FOREIGN PATENT DOCUMENTS

| | | |
|---|---|---|
| WO | WO 96/31239 | 10/1996 |
| WO | WO 03/051137 A1 | 6/2003 |

OTHER PUBLICATIONS

Fisher, et al., "Avian Atherosclerosis: Retardation by Pectin," Nov. 20, 1964.

Harms et al., "Citrus Pulp for Poultry Litter and its Subsequent Feeding Value for Ruminants," Agricultural Experiment Stations Institute of Food and Agricultural Sciences, Bulletin 724, (Technical), Apr. 1968.

Angalet, et al., "Evaluation of Waste Activated Sludge (Citrus) as a Poultry Feed Ingredient," Poultry Science, 1976.

Eldred, et al., "Evaluation of Waste Activated Sludge (Citrus) as a Poultry Feed Ingredient," Nutrition Reports International, Aug. 1976, vol. 14, No. 2.

Savory and Gentle, "Changes in Food Intake and Gut Size in Japanese Quail in Response to Manipulation of Dietary Fibre Content," Longham: printed in Great Britain, Br. Pouli. Sci. 17: 571-580, 1976.

Coleman and Shaw, "Amino Acid Composition of Dried Citrus Sludge and its Potential as a Poultry Feedstuff," J. Agric. Food Chem., vol. 25, No. 4, 1977.

Baig and Cerda, "Studies on the Role of Citrus in Health and Disease," Citrus Nutrition and Quality, 1980.

Robbins, "Medical and Nutritional Aspects of Citrus Bioflavonoids," Citrus Nutrition and Quality, 1980.

Moghazy and Boushy, "Some Neglected Poultry Feedstuffs from Vegetable and Fruit Wastes," World Poultry Science Journal, vol. 38, 1982.

Bone, Chapter 17, "Anatomy and Physiology of the Fowl," Animal Anatomy and Physiology, Second Ed., 1982.

Shah, et al., "Effect of Dietary Fiber Components on Fecal Nitrogen Excretion and Protein Utilization in Growing Rats," Journal of Nutrition, 1982.

Yang and Chung, "Studies of Utilization of Citrus Byproducts as Livestock Feeds," Korean J. Amin. Sci. 26(3) pp. 244-250, 1984.

Yang and Chung, "Studies of Utilization of Citrus Byproducts as Livestock Feeds," Korean J. Amin. Sci. 27(4) pp. 239-245, 1985.

Suh, et al., "Utilization of Citrus Pulp and It's Effect on the Cholesterol Metabolism in Chicks," Korean J. Amin. Sci. 27(10) pp. 673-678, 1985.

Velloso, et al. "Uso Da Polpa Citrica Na Alimentacao Animal," Rev. Fac. Med.vet.Zootec.Univ.S.Paulo, II:21-5, 1985.

Hutton, "Citrus Pulp in Formulated Diets," Recent Advances in Animal Nutrition in Australia, 1987.

Siri, et al., "Effects of Dietary Cellulose Level on Growth Performance Development of Internal Organs, Energy and Nitrogen Utilization and Lipid Contents of Growing Chicks," AJAS, vol. 5, pp. 369-374, 1992.

Attaway, "Citrus Juice Flavonoids with Anticarcinogenic and Antitumor Properties," Chapter 19, Food Phytochemicals I: Fruit and Vegetables, 1994.

Tamasaukas, et al., "Evaluation of the Efficacy of Salstop and Digestor Broilers (Citrade C.A.), Two Products Derived From Citrus Fruit Seed Extracts, Against Avian Coccidiosis: Floor Pen Studies," Parasitol al Dia 20, pp. 118-124, 1996.

Montanari, et al., "Health Promoting Phytochemicals in Citrus Fruit and Juice Products," Chapter 2, Functionality of Food Phytochemicals, 1997.

Attaway and Buslig, "Antithrombogenic and Antiatherogenic Effects of Citrus Flavonoids," Flavonoids in the Living System, 1998.

Kurowska, et al., "Regulation of Apo B Production in HepG2 Cells by Citrus Limonoids," Chapter 13, American Chemical Society, 2000.

Ohara and Yamauchi, "Effects of Dietary Fiber on Growth Performance and Intestinal Development in Chicks," Technical Bulletin of the Faculty of Agriculture, Kagawa University, 2000.

Florou-Paneri, et al., "Effect of Feeding Dried Citrus Pulp on Quail Laying Performance and Some Egg Quality Characteristics," Arch. Geflugelk, 65(4), pp. 178-181, 2001.

Kutlu, "Influences of Wet Feeding and Supplementation with Absorbic Acid on Performance and Carcass Composition of Broiler Chicks Exposed to a High Ambient Temperature," Citations from Food Science & Tech. Abstracts (FSTA), 2001.

Peacock and Kirk, "Comparative Feeding Value of Dried Citrus Pulp, Corn Feed Meal and Ground Snapped Corn for Fattening Steers in Drylot," University of Florida, 2001.

Chapman, et al., "Citrus Feeds for Beef Cattle," University of Florida, 2001.

"Feed Information and Animal Production. Proceedings of the Second Symposium of the International Network of Feed Information Centres" 1983, Commonwealth Agricultural Bureaux, Slough, UK XP001149813 p. 425, S.L. Kang and J.H. Choi: "feeding value of dried citrus peel in broiler diets".

A.R.Y. El Boushy & A.F.B. Van Der Poel: "Poultry Feed From Waste: Processing and Use" 1994, Chapman & Hall Ltd, London, UK XP002236225, Chapter 6: Fruit, vegetable and brewers' waste, p. 218, last paragraph-p. 224, paragraph 3.

A.R. Eldred et al.: "Evaluation of waste activated sludge (citrus) as a poultry feed ingredient. 1. Performance of chicks, broilers and laying hens" Nutrition Reports International, vol. 14, No. 2, 1976, pp. 139-145, XP008015422, XX, XX the whole document.

P. Florou-Paneri et al.: "Effect of feeding dried citrus pulp on quail laying performance and some egg quality characteristics" Archiv Fuer Gefluegelkunde, vol. 65, No. 4, 2001, pp. 178-181, XP008015425, Verlag Eugen Ulmer GmbH, DE, ISSN: 0003-9098, p. 179; table 2.

Database WPI, Section CH, Week 199805, Derwent Publications Ltd., London, GB; AN 1998-042617, XP002235942 & CN 1 136 402 A (Anyang City Animal Quarantine Station), Nov. 27, 1996 abstract.

Abdel-Rahman and El-Naggar, "Chemical Composition and feeding values of 'Baladi' and 'Navel' orange-meals in poultry rations," Indian J. Animal Science, Jun. 1980, pp. 493-495, vol. 50.

Patel, McGinnis and Pubols, "Effect of Dietary Cereal Grain, Citrus Pectin, and Guar Gum on Liver Fat in Laying Hens and Young Chicks," Poultry Science, 1981, pp. 631-636, vol. 60.

Rehman, Ali, Khan and Shah, "Utilisation of Fruit and Vegetable Wastes in Layers' Diet," J. Sci. Food Agric., 1994, pp. 381-383, vol. 65., Great Britain.

International Search Report for International Application No. PCT/US 02/38657, filed on Dec. 4, 2002.

* cited by examiner

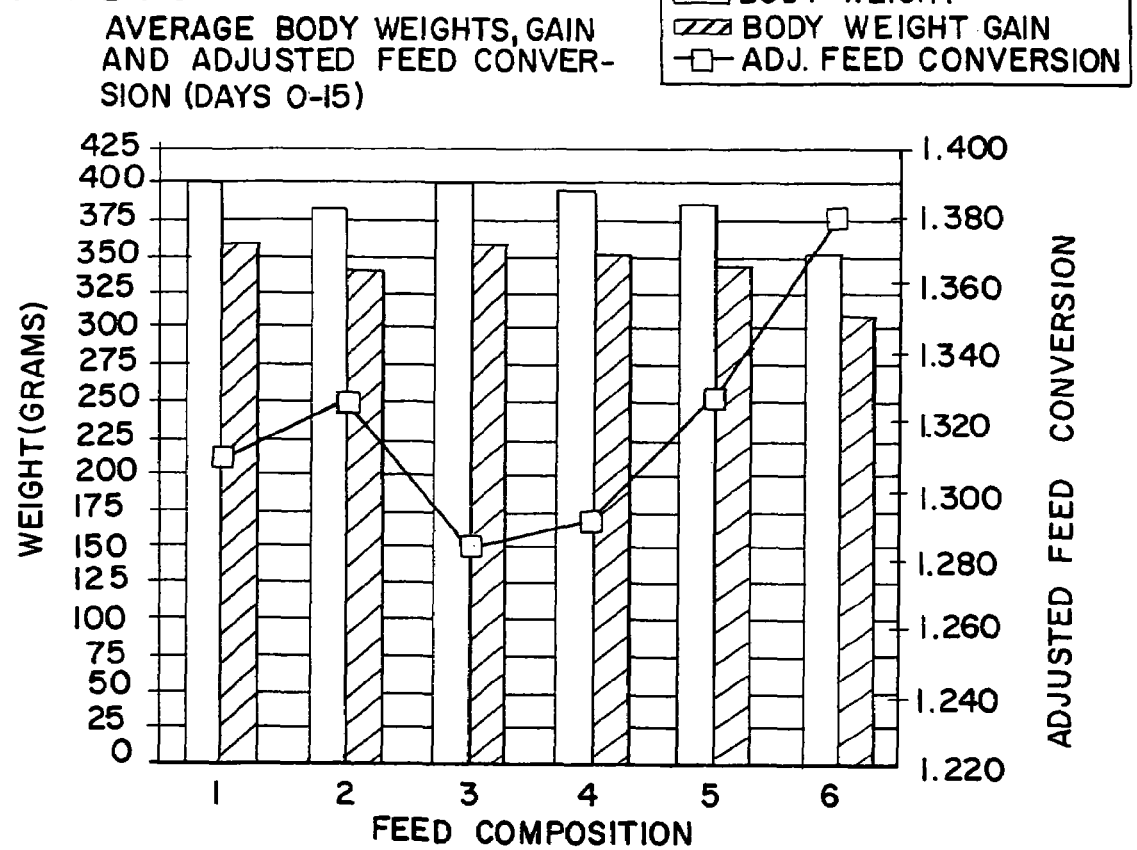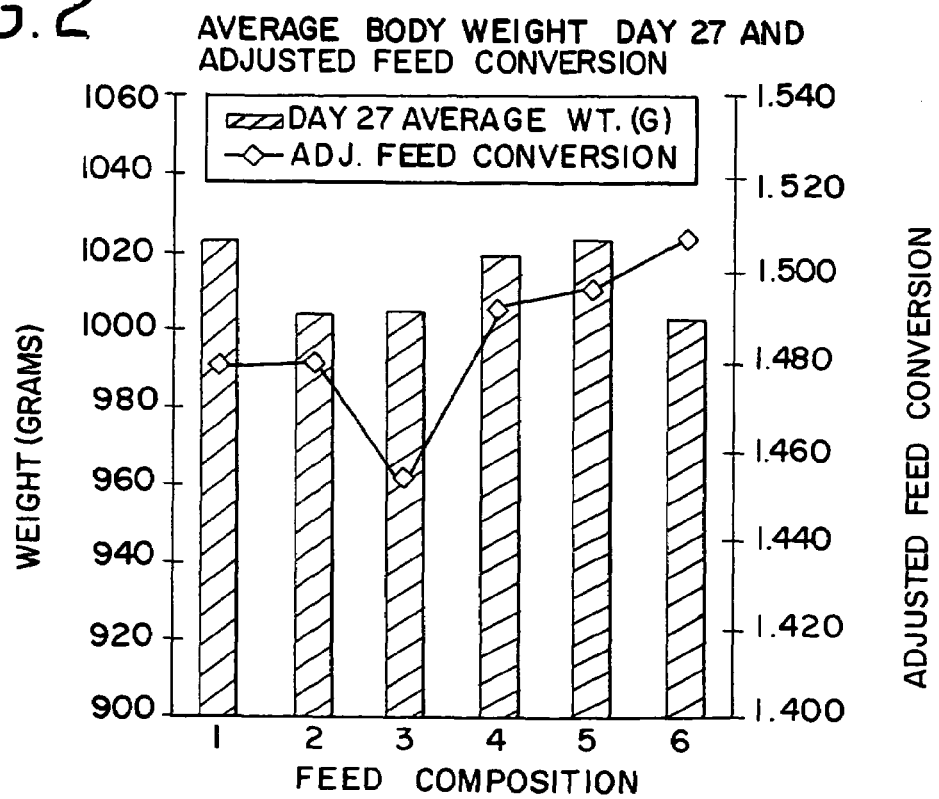

COMMERCIAL POULTRY BREEDER CITRUS BYPRODUCT FEED SUPPLEMENT AND METHOD

CROSS REFERENCE TO RELATED APPLICATION

This is a continuation-in-part of application Ser. No. 10/017,126, filed Dec. 14, 2001, incorporated by reference hereinto.

BACKGROUND OF THE INVENTION

1. Field of the Invention

The present invention relates to feed supplements for commercial poultry breeder facilities, along with a process for improving and enhancing the commercial viability of these types of facilities. The invention also provides a valuable and economically attractive use of citrus byproduct or waste, including components thereof, for use as a feed supplement in commercial breeder operations. Citrus byproduct is used at relatively low levels as a feed supplement to improve the performance of the feed and add significant economic value while maintaining or enhancing bird health and economic values.

This citrus byproduct invention is for improving bird health and the performance in egg production operations such as those of commercial poultry breeder or egg production houses. The invention also is for improving the birds themselves and their egg production and quality.

2. Description of Related Art

Breeder operations in current poultry production represent major capital investments for commercial producers. A primary objective of a poultry breeder operation is to produce fertile eggs that will be hatched to produce chicks for broiler operations and future breeder operations. Any reduction in rate of egg production and/or egg fertility, due to physiological or environmental impacts, can significantly reduce operation efficiency and greatly increase costs. Typically, egg fertility is equated to the percentage of eggs which hatch into viable chicks.

Animal husbandry of poultry breeder birds is typically carried out in two stages. The first is a development stage during which the chicks are grown into "pullets". Breeder bird chicks are grown for a period of 22 to 24 weeks in communal pens. During this earlier stage, the birds are often reared in pens so as to be separated according to sex. Birds are fed a diet formulated to promote longevity and control weight gain of both males and females. At the conclusion of this stage of development, the pullets are ready for the next stage.

In a typical commercial breeder operation, the pullets are transferred to so-called breeder houses for the remainder of their lives. Birds are typically maintained in the breeder house for 30 to 35 weeks. Females and males are placed separately into the houses. Females are placed to the sidewalls of the breeder house, in an area commonly referred to as the 'slat' area. The floor of this growing zone is raised and feces drop through slats onto a concrete collection floor. Fecal material is removed only at the end of a breeder growth cycle. Feed and water are provided in the slat area so that females spend most of their time in this area. Males are excluded from feeding in this area due to the special construction of the feeding troughs. Feed rations are strictly controlled to avoid excessive weight gain of female birds.

In these traditional breeder operations, male birds are placed in the center of the breeder house commonly referred to as the 'scratch' area. This area has a concrete floor that is covered with litter material to a depth of approximately 18 to 24 inches. Male birds are fed and watered in the center of the breeder house so that males congregate in the scratch area. However, male and female birds have free access to both the scratch and slat areas. Male birds are fed a strictly controlled diet to prevent excess weight gain and promote long term health. Male birds are fed in the morning hours. After a period of several hours, feeding stations are raised above bird height in order to prevent all-day feeding behavior.

A primary goal of breeder operations is to achieve good mating and egg laying behaviors of mature birds. Newly placed female pullets come into egg laying maturity after 5 to 6 weeks in the breeder house environment. Females are free at any time to enter the scratch area to be inseminated by male birds. However, female pullets may remain on the slats for several weeks before they enter the scratch area, due to their general insecurity in the new environment and to aggressive behavior by larger male birds. This is discussed in greater detail in Sainsbury, "Poultry Health and Management: Chickens, Ducks, Turkeys, Geese, and Quail, Fourth Edition", Blackwell Science Publishers Ltd., Oxford, 2000. This reference and all others identified herein are incorporated by reference hereinto. After several weeks, females freely enter the scratch area. Each male bird typically mates with a group of 8-10 females. These females are generally serviced only by the one male. Each male creates a territory for himself within the breeder house.

In traditional breeder operations, when females come into egg laying maturity, they frequent nesting boxes that are placed in rows alongside the scratch area. Each female can lay 1 to 3 eggs per day. Egg production per bird peaks at 10 to 12 weeks after placement and slowly declines thereafter. Eggs are laid in the nest boxes and are conveyed to a collection area by a mechanical belt system. Females do lay eggs in nests created on the scratch area floor. These eggs are manually collected. Eggs are also laid on the slats. These eggs are also manually collected each day.

Reduction in mating behavior ultimately reduces egg fertility. The breeder house manager monitors egg fertility often, typically weekly. Reduced egg fertility results in removal of non-mating males with replacement by fresh male pullets in order to restore normal mating behavior throughout the house. This often is referred to as "spiking."

In poultry breeder operations, feed and water is made available to the chicks and pullets and mature birds. Generally, these are high volume facilities, and efficiency and cost control are extremely important. While the majority of these operations are for egg and chicken production, other poultry can be included, such as turkey, ducks, geese and less common poultry as well.

Poultry feed for these types of commercial operations is traditionally formulated in an effort to maximize feed efficiency by improving properties such as live weight gain, feed conversion, adjusted feed conversion and mortality, while seeking to avoid unnecessary feed costs and negative effects on the health of the live birds.

Citrus byproducts have been used extensively for many years (or have been proposed for use) as feed for cattle and other mammals. These uses incorporate citrus byproduct as a food source blended with typical silage sources. Uses or proposed uses of citrus byproducts as feed components for other animals also is generally known. Prior proposals have been made with respect to poultry feed or diet uses for citrus originating materials. Information of interest in this regard includes the following. All references referred to herein are incorporated by references hereinto.

Hutton, "Citrus Pulp in Formulated Diets", *Recent Advances in Animal Nutrition in Australia:* 1987, Farrell, ed, Armdale, Australia, discusses including dried citrus pulp in formulated diets for poultry. The suggestion reported in this publication is to utilize 5 percent dried grapefruit pulp. An article referenced in this connection is El Moghazy et al, "Some Neglected Poultry Feed Stuffs from Vegetable and Fruit Wastes," 1982. This article summarizes feeding trials with dried citrus sludge or dried citrus pulp as a feedstuff component at about 7.5 weight percent.

In their "Studies on Utilization of Citrus Byproducts as Livestock Feeds", *Korean Journal of Animal Science,* 26(3), 244-250, 1984 and 27(10), 673-678, 1985, Yang and Chung report information concerning the feeding value of citrus byproducts on broiler chicks and layer hens. Feed blends including between 5 percent and 15 percent by weight of dried citrus pulp and/or peel are noted. These articles suggest an overall conclusion that feeding dried citrus pulp or peel is detrimental to weight gain and feed conversion values. Velloso, "Use of Citrus Pulp in Animal Feeding", University of Sao Paulo, Brazil, 1985, reports that broilers that have reached twenty one days of age can utilize up to 5 percent citrus pulp in their diet. Table 6 of this article reports feeding at 20 percent, 40 percent and 60 percent as an in affect replacement of milo.

Deyoe et al, "Citrus Biflavonoids in Broiler Diets", *Poultry Science,* Volume 41, pages 1088-1090, 1962, reports upon a non-isocaloric addition of as low as 0.5 percent of "citrus bioflavonoids" (from Sunkist Growers, Ontario, Calif.) without specifying or identifying the bioflavonoids. This article acknowledges the bioflavonoid material hesperidin as a bioflavonoid. This article generally reports that mortality was reduced as the level of citrus bioflavonoid inclusion was increased (up to 5 percent), with a poorer feed conversion performance at higher levels.

Tamasaukas et al, "Evaluation of the Efficacy of Salstop and Digestor Broilers (Citrade C.A.), Two Products Derived From Citrus Fruit Seed Extracts, Against Avin Coccidiosis: Floor Pen Studies," *FLAP, Parasitol al Dia,* 20: 118-124, 1996, reports on testing of citrus fruit seed extracts for use against coccidiosis in broilers. Each seed extract was added to the broiler feed at relatively low levels. The extracted components were used at levels as low as 500 grams/ton of food.

Patel et al, "Effect of Dietary Cereal Grain, Citrus Pectin, and Guar Gum on Liver Fat in Laying Hens and Young Chicks", *Poultry Science,* 60:631-636, 1981 reports on various feeds, including some with citrus pectin, for laying hens. In addition, Zio-ur-Rehman et al, "Utilization of Fruit and Vegetable Wastes in Layers' Diet", *Journal of Food Science Agriculture,* 65:381-383, 1994 references improvement in egg production and egg size using a carrot residue indicates and results that are comparable to the control with a diet for layers that contained orange waste.

Much of this literature indicates that citrus byproducts can be used as a feed component at levels which might be considered relatively low. Even at these relatively low levels, these reported results are mixed in that feed efficiency and bird health aspects can be inconsistent in generally providing positive results in one area at the expense of seeing negative results in another area. This problem is not clearly solved by incorporating only bioflavonoids or extracts from citrus seeds. Besides the reported mixed results, using bioflavonoids or seed extracts adds having to separate the natural combination of citrus waste into individual bioflavonoids or extracts through separation or isolation techniques.

A particularly desirable solution would be to be able to use an inexpensive natural additive to poultry feed in order to enhance feed performance without detrimentally affecting the birds' health or mortality. Effective materials which are byproducts that do not require isolation or extraction to be suitable for use in poultry feed are recognized herein as being of value in this regard when used at levels characteristic of a feed supplement rather than at levels of a component of a feed blend, typically one which is intended to provide food value.

The present invention addresses these matters by providing a feed supplement which is inexpensive, widely available and requires no separation of individual bioflavonoids or isolation of components useful as supplements. The invention provides a feed supplement for poultry breeder operations which is citrus byproduct. The preferred citrus byproduct is dried citrus peel or pulp from citrus operations which generate citrus peel or pulp byproduct or waste during citrus juice extraction. The invention can entail a process for enhancing commercial poultry breeder operations, which includes mixing dried citrus peel byproduct material at supplement or additive levels into commercial feed formulations, while enhancing bird health and reducing bird mortality and adjusted feed conversion and while reducing ammonia levels within the poultry pens.

An aspect or object of the present invention is to provide an improved feed diet for commercial poultry breeder operations.

Another aspect or object of the present invention is to provide an improved poultry breeder process through the use of a natural organic source of a feed supplement which controls negative aspects of commercial poultry breeder operations and enhances feed effectiveness.

Another aspect or object of this invention is to provide an improved poultry breeder diet composition and process by which a change in the composition of the poultry feed itself addresses substantial problems in poultry breeding, such as by lessening ammonia generated by the birds.

Another aspect or object of the present invention is to provide an economically beneficial and productive outlet to breeder operations for large quantities of solid byproduct from commercial citrus juice expressing operations.

A further aspect or object of this invention is to provide a product and process which enhances the effectiveness of poultry feed in breeder operations.

Another aspect or object of the present invention is to provide a product and process in the poultry feed business for breeder operations where a supplement remains as intact particles of a naturally occurring byproduct composition.

Another aspect or object of embodiments of this invention is to provide improved product and process advances for breeder operations which use effective and inexpensive feed supplement material in its "native" state without requiring extraction, isolation, purification and/or physical modification.

These and other objects and advantages of the present invention will be understood from the following description according to preferred embodiments of the present invention, relevant information concerning which is shown in the accompanying drawings.

BRIEF DESCRIPTION OF THE DRAWINGS

FIG. 1 is a plot and bar graph representation of weight and feed conversion data at different levels of citrus peel addition to feed for chickens; and FIG. 2 is a plot and bar graph representation of weight and feed conversion information including that of chemicals known to be present in citrus peel.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

In commercial-scale poultry breeder operations, the poultry often are restricted to confined spaces for reasons which are well appreciated and are of economic value. The poultry are fed diets intended to enhance growth, production and bird health. The formulated diet is the major cost incurred in commercial poultry production. At times, supplements are added to feed for a variety of objectives. One aspect of the present invention focuses on a very economical source for a supplement or feed additive for poultry feed for these breeder operations.

The present invention positively impacts bird health with the use of citrus sources. This includes a dried citrus byproduct as a diet supplement for poultry breeders. Incorporation of dried citrus peel into breeder bird rations is for improving bird health due to improvements in cardiovascular health and feed conversion. Red color of male bird's combs and wattles is a general indicator of good bird health. Birds in physiological decline often show a purple comb/wattle color. Breeder house managers often change diet formulations and daily rations in response to observation of purple comb/wattle color. Incorporation of dried citrus peel into bird diets applies to both male and female birds is for reducing mortality of aged birds. Specifically, this citrus supplemented diet is intended to improve male bird health for improving mating behavior over a longer period of time, and reduce the need to "spike" males during the breeder cycle. Reduced spiking can significantly reduce costs during the 35 week breeder period.

In general the citrus diet supplement is for positively impacting breeder bird performance in multiple ways. These include: improvement of cardiovascular health and feed conversion; reduced mortality of males and females; improved longevity of male mating behavior; reduced need to spike males; and improved egg laying productivity of females.

Poultry breeder operations can include noting weight gain parameters. Also included can be objective inspection of the birds for certain imperfections. Imperfections which can be monitored include foot defects. One manner of characterizing foot defects is to inspect for so-called foot pad lesions. This includes inspecting the pad of each foot of each bird and recording a foot pad score. In a typical inspection, a score of "3" indicates that a large, open sore lesion was detected on the pad. A score of "2" indicates that a smaller lesion is present. A score of "1" indicates pad burn (dermis), while a score of "0" indicates both foot pads are normal. In many situations, a score of "0" or "1" indicates poultry which is suitable for sale.

It is suggested that the state of the bird housing environment can substantially affect foot defects such as foot pad lesions, as well as others such as breast blisters. It has been observed that the degree of negative impact on these indicators of bird quality relates to the level of ammonia in bedding litter during the course of its use. When ammonia levels increase unchecked, ammonia toxicity levels can be reached. Ammonia toxicity in some commercial poultry operations has been linked to poultry blindness, dermatitis and respiratory issues.

Proper feed supplements according to the invention reduce the level of ammonia within poultry pens including within the litter. Excess ammonia within the poultry raising environment can lead to poultry air sack damage. Bacterial infections and lung collapse also can be the result of ammonia exposure. Lowering ammonia levels by any means is very advantageous.

Feed additive or supplement compositions of this invention also are advantageous to bird health in positively impacting mortality or related bird health issues. Poultry can experience cardiovascular difficulties, leading to bird death or poor mating performance or egg production and weight. One suspected cause of such bird mortality or health-damaging issues is a negative reading with respect to cholesterol levels. A poor ratio of high density cholesterol level to low density cholesterol level (HDL:LDL ratio) is generally understood to be detrimental to bird health. A higher HDL:LDL ratio is preferable to a lower one. A higher HDL level is recognized as being more healthful than a lower HDL level. Another factor which generally negatively impacts bird health is an elevated fat level. The invention addresses these matters in that typically HDL levels and HDL:LDL ratios are raised, and/or fat levels are lowered.

Supplements for feed according to this invention can provide advantageous feed conversion results while maintaining bird weight characteristics. Bird weight is determined by body weight measurement, typically done by measuring the weight of each bird. Feed performance data for feed containing the supplements according to the invention can exhibit improved feed conversion values and improved adjusted feed conversion values, wherein the average adjusted feed conversion value is defined as a ratio of a total feed consumption for the poultry breeders over a time period to a total weight gain of the poultry breeders over the time period after removal of a weight of any poultry breeders that died during the time period.

The feed supplement for breeder uses include advantageous components which have biological activity believed to be positive for breeders. This activity can negate many of the negative effects noted herein. Examples in this regard include one or more of the following components and indicated biological activity or activities which are presently believed to contribute positively to the invention. Each component typically is found in dried citrus peel or pulp byproduct or waste from citrus fruit extraction facilities.

Pectin and demethylated pectin are believed to effectively bind ammonia, resulting in a reduction of gaseous ammonia. These are useful components of feed supplement and bedding litter compositions. Used litter, including excrement contained thereon from birds rationed with the feed supplement, exhibits an enhanced bound ammonia content to provide a natural nitrogen source for fertilizers, for example. Such can be a source of slow-release nitrogen when incorporated into agricultural fertilizer such as for horticultural applications.

Cellulose, hemicellulose and starch are components contributing moisture absorption and release functions in soiled bedding. Their inclusion in dried flaked citrus byproduct of the breeder litter provides benefits of this type.

Food grade acids such as citric acid and malic acid are acidifiers for enhancing general breeder bird health. Such acids are found in citrus byproduct or waste from citrus extraction facilities.

Antioxidants can positively impact breeder bird health, including ascorbic acid, carotenoids, beta-carotene, beta-cryptoxanthin, lycopene, and xanthophylls. Citrus byproducts provide some or all of these. They can be especially accessible in dried flake citrus byproduct according to a preferred embodiment of the breeder litter aspect of the invention.

Antimicrobial activity, antiviral activity, and general bird health are positively addressed in breeder operations by components from citrus byproducts which are flavonoids including naringin, naringenin, narirutin, hesperidin and hesperetin as well as polymethoxylated flavones including sinensetin, tangeretin and nobiletin.

Tocopherols promote general bird health and are believed to be of assistance in controlling odor of soiled breeder litter. These are available within citrus peel byproduct material.

Antimicrobial and/or insect antifeedant activities or insecticidal activities are believed to be provided to breeder operations by components including limonin, nomolin, limonin glucosides, and d-limonene. Each is provided by citrus byproduct such as citrus peel and pulp byproducts, including in flake and pellet form.

The breeder feed supplement according to the invention is preferably one which is readily available and relatively inexpensive. It is a byproduct or waste from commercial citrus juice operations. One particular advantage of the present invention is the ability to avoid having to further treat this waste product (aside from a typical simple size-reduction step) before being able to realize its beneficial and valuable effects at low, supplement or additive levels in poultry breeder feed diets. This citrus byproduct provides a naturally occurring combination or complex mixture of citrus byproducts. This naturally occurring combination need not be subjected to treatment beyond that currently conventionally practiced in the citrus juice extraction industry. The only additional step of processing the traditional byproduct into the feed supplement which may need to be practiced is grinding this commodity so as to facilitate its mixing into the poultry feed in a substantially uniform manner.

In addition to incorporating such beneficial components in a very readily available and inexpensive source, such dried citrus peel sources have organic qualities and break down organically after removal from poultry breeder houses as a component of used litter, due to their inclusion in the excrement from birds fed with the citrus supplemented feed.

The citrus byproduct typically is the product of traditional citrus residue processing into so-called dried pulp. This typically includes a so-called liming process in which the raw, wet citrus residue is treated with calcium oxide ("quicklime"), pressed and dried into loose dried pulp. This can serve as the dried citrus byproduct as used herein. Details on the production of this loose dried pulp can be found in Braddock, *Handbook of Citrus By-Product and Processing Technology*, Chapter 10, "Dried Pulp, Pellets and Molasses," pages 135-148.

It is believed that this liming demethylates or de-esterifies pectin present in the loose dried pulp at about 30 weight percent of the dry matter. This demethylated pectin is favorable for binding ammonia.

With further reference to the additive or feed supplement of the invention, the citrus whole byproduct or waste is characterized by being included within the diet composition at a level which is characteristic of a supplement to an animal feed, especially a poultry feed. Concentrations above this general level are defined herein as being a feed component, typically a component which is intended to provide food value to the feed composition, rather than supplement performance in a non-caloric manner.

The feed supplement according to the invention does not add any significant feed value to the feed diet composition fed to the poultry. Typically, the citrus feed supplement is at a level of not greater than about 2 weight percent. Preferably, the feed supplement according to the invention is at a level of not greater than about 1.5 weight percent. An especially preferred range is between about 0.2 weight percent and about 1 weight percent. All of these weight percentages are based upon the total weight of the diet feed composition. Usually, the citrus feed supplement will be at a level of not more than about 32 pounds per ton of diet feed composition, preferably not more than about 24 pounds. An especially preferred range is between about 4 and about 16 pounds per ton.

As previously noted, the feed supplement naturally contains components typically found in citrus peel or pulp byproduct or waste from citrus fruit juice extracting facilities. In customary processing operations at these facilities, the citrus peel or pulp byproduct is dried in accordance with generally known industry practices. It is understood that such peel or pulp byproduct includes extraction residue in addition to peel and pulp. Included is citrus peel, citrus pulp, citrus flavedo, citrus albedo and citrus rag. The product of traditional citrus residue is processed into so-called dried citrus pulp and/or peel. Often the previously referenced liming process is practiced.

The dried citrus peel or pulp byproduct or waste as discussed herein is a readily available and relatively inexpensive source for the diet supplement according to the invention. Dried citrus byproduct incorporates one, some, many or all of the chemicals or components noted above and elsewhere herein. For economic and positive environmental and organic reasons, the components can be used as is and without requiring extraction, purification or isolation of the individual chemicals. They can be provided in their native state and in the valuable combinations already present in dried citrus peel and/or pulp. When thus provided, the citrus byproduct avoids the use of chemical extraction agents such as organic solvents which might not be totally appropriate for use in a feed supplement. This provides a supplement which is heterogeneous in terms of components present within the supplement.

In addition to being provided as flaked material, the citrus waste can also be reshaped into pelletized form. At times, this pelletizing is carried out to facilitate handling. Often, dried citrus waste is in this form for a traditional use of same as feed for ruminants. Dried citrus byproduct waste, peel and/or pulp can be provided in this pelletized form. Whether provided as citrus flake or citrus pellets, the byproduct is ground or comminuted to a particle size on the order of about 2 mm or less for the breeder feed supplement of the invention.

One potential advantage of the natural feed supplement for breeders according to the invention is that it has the potential for substantially reducing or eliminating the use of pesticides and antibiotics. Thus, breeding can more readily occur in a "pesticide free" environment. In addition, the supplement according to the invention is compatible with other feed stock ingredients, including vitamins and inorganic components.

Certain enhancements of the present poultry feed supplement are illustrated by the following.

EXAMPLE 1

Dried citrus peel is used as a dietary supplement for improving adult bird health and performance in egg production operations typical of poultry breeder production facilities. Pelletized citrus byproduct as described herein is ground and added to the feed at a level of 8 pounds of ground citrus byproduct per ton of feed. Chicks are fed this diet through to between about 21 and 25 weeks of maturity until reaching the pullet phase. This is followed by a 35 week hatch phase, during which bird performance is observed. This feed treatment is for improvement in cardiovascular health and general fitness and for improved egg production of the hens, particularly in the final period of egg laying productivity. This final period is on the order of 8 to 10 weeks. Improvement is also in male health and general fitness for improving mating behavior. Improved mating behavior is for improving the percentage of hatched eggs in the commercial breeder operation. In addition, improved cardiovascular health is for reducing bird mortality and reduction in cost of bird replacement during a 30 week laying period.

With this approach in commercial egg operations, adult bird weight is controlled by restriction of feed since overweight males exhibit diminished mating behavior, and overweight females tend to lay fewer eggs per week. Furthermore, mortality of birds increases with weight gain. The citrus supplemented diet is for improving cardiovascular health and mortality reduction, particularly in older birds. It is also for improving behavior to maintain efficient egg production during the laying period. The citrus supplemented feed is isocaloric to the composition of the base diet. These bird diets are formulated to approximate standard breeder/hatchery diets used in the poultry industry. The addition of growth promoters, antibiotics and/or coccidiostats are used according to standard industry practice. This is the approach for the first phase of growth to pullets.

In the second phase of breeder operations which includes egg production and/or fertilization, bird diets are formulated to approximate a standard breeder/hatchery diet used in the poultry industry. This includes adding performance supplements in accordance with standard industry practices. This citrus-supplemented diet continues throughout a 35 week observation period. This citrus supplement diet also is isocaloric to the composition of the base diet. Nesting boxes are provided according to industry standard practices.

Egg production and quality during the second phase is monitored, and the number of eggs produced per pen is recorded. Egg quality analyses are conducted for determining average egg weight, percentage hatch, and bacterial contamination of eggs.

EXAMPLE 2

Chickens are fed feed compositions containing varying levels of citrus peel for a battery cage study protocol over a given time period. The citrus peel is provided as pellets, which are ground using a corn grinder. In all but the control, this ground peel is mixed with the basal feed having an approximate nutrient composition of 6.0 percent protein, 2.0 percent fat, 16.6 percent fiber and 3.0 percent calcium. The diets are fed ad libitum for days 0 through 15 for each diet composition. No other feed additives are included in the diets.

The feed compositions are as follows: Composition 1 is the control, having no citrus supplement added thereto. Feed Composition 2 has 4 pounds per ton of a supplement of the citrus peel blended thereinto. Composition 3 has 16 pounds per ton of the citrus feed supplement added thereto. Composition 4 has 32 pounds per ton of the ground citrus material added to it. Composition 5 has 64 pounds per ton of the ground citrus material added to it. Composition 6 has 128 pounds per ton of the ground citrus material added to it.

A filler mixture is formulated that is included in the treatment diets in place of the citrus peel product. This provides for nutrient compositions being fairly equal among the treatment groups. Each of the diets is calculated to have equivalent calories per pound of feed.

Battery cages are used, and equipment is provided to have all feed added and removed from each cage weighed. Mortality and culling data are recorded. Birds are weighed by cage on day 0 and on day 15. Feed intake for each cage is determined for days 0 through 15. Feed conversion for each cage is calculated based on day 15 cage body weight. Adjusted feed conversion is calculated by accounting for mortalities and removals throughout the study.

FIG. 1 reports data from a battery cage study of this type on commercial broiler chickens. Composition 6 (128 pounds of ground citrus per ton of feed, or 6.4 weight percent) is significantly inferior in terms of feed conversion than the control Composition 1 and other compositions. The birds fed Composition 3 and Composition 4 (16 pounds and 32 pounds per ton of feed, or 0.8 weight percent and 1.6 percent, respectively) perform best according to these data.

The data illustrated in FIG. 1 are as follows: Control Composition 1: 401 grams day 15 average body weight, 359 grams body weight gain over day 0 through day 15, and 1.309 adjusted feed conversion. For Composition 2, these values are 384 grams, 342 grams and 1.326. For Composition 3, these values are 403 grams, 361 grams and 1.284. For Composition 4, these values are 396 grams, 354 grams and 1.292. For Composition 5, these values are 389 grams, 347 grams and 1.328. For Composition 6, these values are 356 grams, 314 grams and 1.381.

EXAMPLE 3

A battery cage study is conducted with poultry as generally discussed in Example 2 and with a protocol substantially as discussed in Example 2. Here, the study lasts for 27 days, and the diets differ from those of Example 2 in the following respects. Composition 1 continues to be the control feed having no added citrus supplement. Composition 2 added 8 pounds per ton (0.4 weight percent) of the ground citrus byproduct described in Example 3. Each of feed Compositions 3, 4 and 5 are supplemented with isolated and purified compounds which are found in citrus peel byproduct. Composition 6 contains a supplement which is a combination of these three chemical compounds. Each of the compositions is formulated so that the respective feeds were isocaloric.

More particularly, Composition 3 contains 104 ppm of hesperidin. Composition 4 contains 4.3 ppm of limonin glucoside. Composition 5 contains 0.12 weight percent of citrus pectin, based on the total weight of this feed composition. Composition 6 combines each of these three chemical compounds at these specified concentrations.

FIG. 2 shows data from a battery cage study of this type for commercial chicken broilers. Control Composition 1 has an average weight at day 27 of 1,026 grams and an adjusted feed conversion of 1.479. Natural make-up citrus peel byproduct Composition 2 has a day 27 average weight of 1,004 grams and adjusted feed conversion of 1.480. Composition 3, supplemented with hespridin, has a day 27 average weight of 1,005 grams and an adjusted feed conversion of 1.451. Composition 4, supplemented with a limonin glucoside, has a day 27 average weight of 1,019 grams and an adjusted feed conversion of 1.93. Composition 5, supplemented with citrus pectin, has a day 27 average weight of 1,023 grams and an adjusted feed conversion of 1.496. Composition 6, which contains all three of the chemical additives, results in an average body weight of 1,005 grams and an adjusted feed conversion of 1.507.

In this study, the hesperidin is 97 percent pure, as can be obtained from Aldrich Chemical Company. The limonin glucoside is mixed limonin glucosides at a 99 percent purity level, as can be provided by U.S.D.A.-ARS, Albany, Calif. The citrus pectin chemical component comprises low methoxyl pectins from citrus, being 99.5 percent pure, and can be obtained from SKW Biosystems.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A process for enhancing commercial poultry breeder operations, comprising:

supplying a space having an area at which poultry breeders are fed;

providing a breeder poultry feed diet composition which comprises a nutritive balanced feed composition and a citrus feed supplement, said citrus feed supplement being a citrus byproduct generated by expressing citrus juice from citrus fruit, the citrus byproduct comprising citrus peel or pulp, said citrus feed supplement being at a concentration of not more than 1.6 weight percent, based on the total weight of the poultry feed diet composition; and placing said breeder poultry feed diet composition within the area at which poultry breeders are fed, thereby having the poultry feed on the breeder poultry feed diet, wherein the poultry feed diet composition provides sufficient nutrition for the poultry breeders to achieve an average adjusted feed conversion value that is lower than an adjusted feed conversion value for poultry breeders feeding on the nutritive balanced feed composition without the citrus feed supplement wherein the average adjusted feed conversion value is defined as a ratio of a total feed consumption for the poultry breeders over a time period to a total weight gain of the poultry breeders over the time period after removal of a weight of any poultry breeders that died during the time period.

2. The process in accordance with claim 1, wherein said citrus feed supplement is at a concentration of at least about 0.2 weight percent and up to about 1 weight percent, based upon the total weight of the poultry feed diet composition.

3. The process in accordance with claim 1, wherein said citrus feed supplement is at a concentration of at least about 4 pounds and up to about 16 pounds per ton of feed diet composition.

4. The process in accordance with claim 1, wherein said citrus byproduct has a moisture content of between about 5 and about 12 percent by weight, based upon the total weight of the citrus byproduct.

5. The process in accordance with claim 1, wherein said citrus feed supplement comprises particles of dried citrus byproduct flake.

6. The process in accordance with claim 1, wherein said citrus feed supplement comprises particles of pelletized dried citrus byproduct.

7. The process in accordance with claim 1, wherein said citrus byproduct comprises citrus waste selected from the group consisting of: citrus peel, citrus pulp, citrus flavedo, citrus albedo, citrus rag, and combinations thereof.

8. The process in accordance with claim 1, wherein said citrus byproduct of the citrus feed supplement is a dried and limed byproduct.

9. The process in accordance with claim 1, wherein said citrus feed supplement comprises a combination of byproduct components, each of said byproduct components being in a state as natively present in dried citrus byproduct produced from juice extraction equipment.

10. The process in accordance with claim 9, wherein said byproduct components comprise at least one component selected from the group consisting of:

(a) pectin, demethylated pectin, and combinations thereof; (b) a food grade citrus-originating acid; (c) hesperidin, other flavonoids, and combinations thereof; (d) one or more limonin glucosides other bioflavonoids and combinations thereof; (e) sinensetin, tangeretin, nobiletin, other polymethoxylated flavones, and combinations thereof; and (f) any combination of components (a)-(e).

11. The process in accordance with claim 1, wherein said providing of the breeder poultry feed diet composition is carried out in at least two stages including a first stage during which the poultry is fed for a length of time adequate for the poultry to grow to pullet size and a second stage during which female poultry lay eggs at least some of which are fertilized for hatching into poultry chicks.

12. The process according to claim 1, wherein the providing of said citrus feed supplement places citrus byproduct into the poultry feed diet without purifying the citrus byproduct present in the citrus feed supplement.

13. The process according to claim 1 wherein the providing of said citrus feed supplement places citrus byproduct into the poultry feed diet without extracting the citrus byproduct present in the citrus feed supplement.

14. The process in accordance with claim 1, wherein the poultry feed diet composition provides sufficient nutrition to provide an adjusted feed conversion value of about 1.284 or 1.292 for the poultry breeders.

15. The process in accordance with claim 1, wherein the poultry feed diet composition provides sufficient nutrition to provide an adjusted feed conversion value of less than about 1.309 for the poultry breeders.

16. The process in accordance with claim 1, wherein the poultry feed diet composition provides sufficient nutrition for the poultry breeders to achieve an average adjusted feed conversion value that is about 2% lower than the adjusted feed conversion value for similar poultry breeders feeding on the nutritive balanced feed composition without the citrus feed supplement.

* * * * *

UNITED STATES PATENT AND TRADEMARK OFFICE
CERTIFICATE OF CORRECTION

PATENT NO. : 7,563,471 B2  Page 1 of 1
APPLICATION NO. : 10/784855
DATED : July 21, 2009
INVENTOR(S) : Keithly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this

Twenty-sixth Day of October, 2010

David J. Kappos
*Director of the United States Patent and Trademark Office*